United States Patent
Lee et al.

(10) Patent No.: US 10,530,202 B2
(45) Date of Patent: Jan. 7, 2020

(54) ROTOR WITH INSULATOR AND MOTOR HAVING THE SAME

(71) Applicant: LG INNOTEK CO., LTD., Seoul (KR)

(72) Inventors: Jong Chan Lee, Seoul (KR); Byung Sam Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 264 days.

(21) Appl. No.: 15/216,333

(22) Filed: Jul. 21, 2016

(65) Prior Publication Data

US 2017/0025908 A1 Jan. 26, 2017

(30) Foreign Application Priority Data

Jul. 21, 2015 (KR) .................. 10-2015-0103176

(51) Int. Cl.
  *H02K 1/24* (2006.01)
  *H02K 3/52* (2006.01)
  *B60L 50/50* (2019.01)

(52) U.S. Cl.
  CPC .............. *H02K 1/24* (2013.01); *B60L 50/50* (2019.02); *H02K 3/527* (2013.01)

(58) Field of Classification Search
  CPC .......... H02K 1/148; H02K 3/32; H02K 3/325; H02K 3/34; H02K 3/345; H02K 1/24–1/246; H02K 1/26–1/265
  USPC ................. 310/194, 195, 214, 215
  See application file for complete search history.

(56) References Cited

U.S. PATENT DOCUMENTS

| 2003/0006663 | A1  | 1/2003 | Hsu |
| 2004/0113511 | A1* | 6/2004 | Schmidt ................. H02K 1/148 310/216.061 |
| 2004/0164639 | A1* | 8/2004 | Yamamoto ............. H02K 1/148 310/216.012 |
| 2005/0206264 | A1* | 9/2005 | Yamamoto ............. H01R 39/32 310/216.001 |

(Continued)

FOREIGN PATENT DOCUMENTS

| CN | 1774849 | 5/2006 | |
| JP | 58069444 A | * 4/1983 | ............... H02K 1/24 |

OTHER PUBLICATIONS

Machine Translation, Inoue, JP 58069444 A, Apr. 1983.*
Chinese Office Action dated May 21, 2019 issued in CN Application No. 201610581369.5.

*Primary Examiner* — Thomas Truong
(74) *Attorney, Agent, or Firm* — KED & Associates, LLP

(57) ABSTRACT

A rotor includes a first insulator coupled to a first rotor core, and a second insulator coupled to a second rotor core. The first rotor core may include first teeth protruding from a first outer circumferential surface thereof, and the second rotor core may include second teeth protruding from a second outer circumferential surface thereof. The first insulator may include a body configured to surround the first teeth. A first outer guide may be formed at an outside of the body with respect to a radial direction of the first rotor core, and the second insulator may include a body configured to surround the second teeth. A second outer guide may be formed at an outside of the body with respect to a radial direction of the second rotor core. The first teeth and the second teeth may be disposed at different positions with respect to a circumferential direction.

13 Claims, 21 Drawing Sheets

(56) References Cited

U.S. PATENT DOCUMENTS

2008/0018197 A1* 1/2008 Yamamoto ............. H02K 1/148
  310/268
2014/0015349 A1* 1/2014 Chamberlin ........... H02K 3/345
  310/43
2014/0159540 A1 6/2014 Kim et al.

* cited by examiner

ROTOR WITH INSULATOR AND MOTOR HAVING THE SAME

CROSS-REFERENCE TO RELATED APPLICATION

This application claims priority under 35 U.S.C. § 119 to Korean Patent Application No. 10-2015-0103176, filed on 21 Jul. 2015, whose entire disclosure is incorporated herein by reference in its entirety.

BACKGROUND

1. Field

Embodiments relate to a rotor and a motor having the same.

2. Background

A vehicle includes a starter motor which drives an engine and an alternator which generates electricity using a rotational force of the engine. The starter motor has an ignition switch which is connected to a power supply of a battery by an operation of a driver when the vehicle is started, power is supplied to the starter motor through the connection, and the vehicle is started by the engine being rotated by a driving force generated by the starter motor. In comparison, an alternating current (AC) power is generated by the alternator being connected to a driving unit of the engine to rotate a rotor while a magnetic field is formed by a driving force of the engine, and thus the battery is charged using a rectifier or the like.

Since both of the starter motor and the alternator are configured in a stator-rotor structure, structures of the starter motor and the alternator are very similar to each other and can be operated as a power generator or a motor depending on whether a force or power is applied. Recently, a belt driven starter generator (BSG) capable of functioning as a starter motor and an alternator with a single structure is actively being studied.

A wound rotor synchronous motor is a motor having teeth which protrude from an outer circumferential surface of a rotor core and around which a coil is wound. The wound rotor synchronous motor has not only been mainly used as a generator but has also been recently proposed as a form of a traction motor since a development of a rare earth-free motor has been spotlighted.

However, a motor has to increase its number of coils or current to increase its torque. However, in the case of a BSG, there is a problem in that an increase in a torque of the motor is limited because there is a limit in increasing the number of wound coils due to spatial constraints and in increasing a current due to a current limit.

Also, an inlet through which a nozzle is inserted into a winding space is formed between teeth of a rotor that are adjacent to each other to perform winding, and coils wound through the inlet may deviate therefrom, and thus the space should be closed with a separate member after the winding. Therefore, there is a problem in which manufacturing time and manufacturing costs are increased

BRIEF DESCRIPTION OF THE DRAWINGS

The embodiments will be described in detail with reference to the following drawings in which like reference numerals refer to like elements wherein.

DETAILED DESCRIPTION

Figure 1:
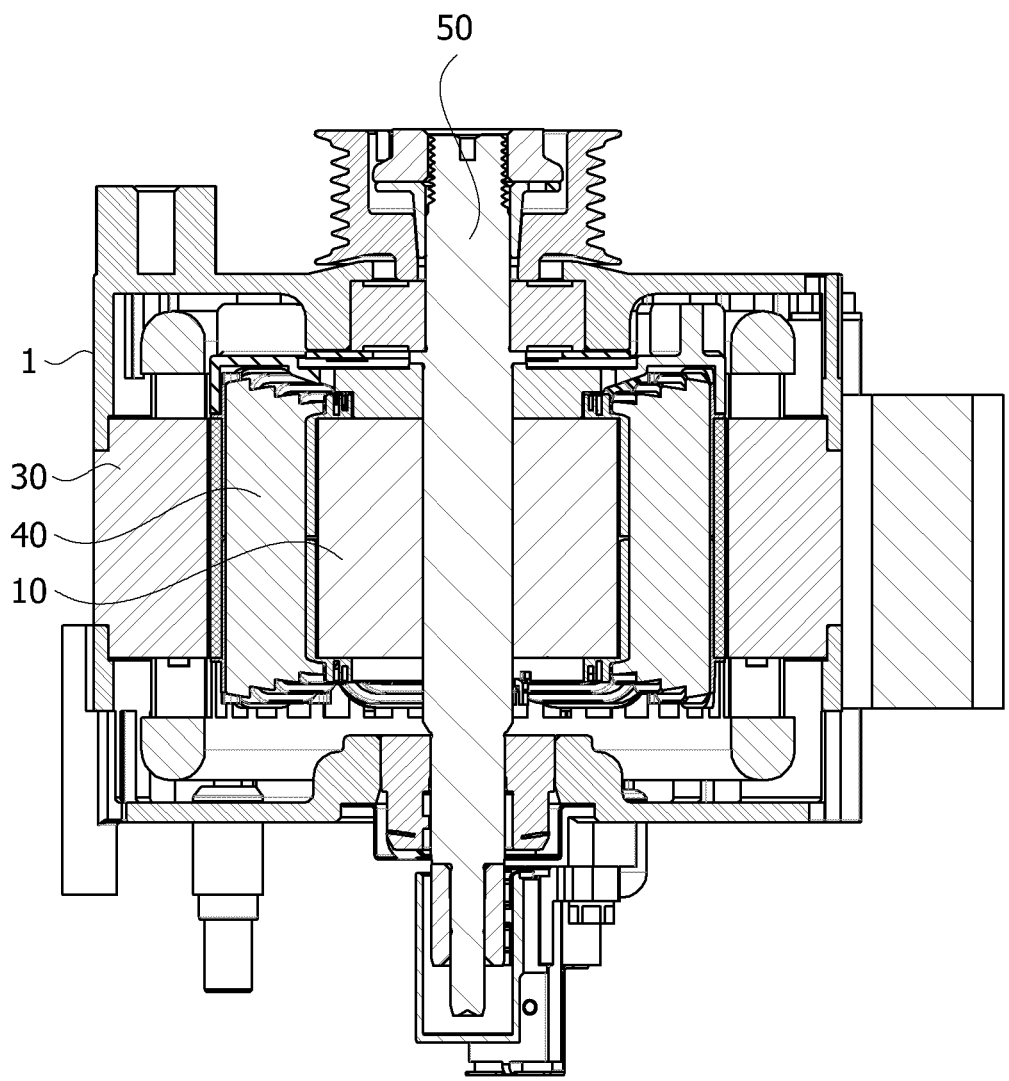
FIG. 1 is a view illustrating a motor according to an embodiment of the present disclosure.

Referring to FIG. 1, a motor may include a stator 30 in a housing 1. A rotor 10 is included in the stator 30, and a coil 40 may be wound around the rotor 10. The coil 40 may induce an electrical interaction with the stator 30 to rotate the rotor 10 or induce power by the rotating rotor 10.

Specifically, when the motor operates as a starter motor, the rotor 10 is rotated by an applied driving current to rotate a pulley belt (not shown) connected to a rotating shaft 50 of the rotor 10, and an external component (an engine and the like) may be operated. Here, in the case of a vehicle, the pulley belt may be connected to a crankshaft of an engine.

Conversely, when the motor operates as an alternator, the pulley belt (not shown) is rotated by an operation of an engine to rotate the rotor 10, and an alternating current (AC) is generated. The generated AC may be supplied to an external component (a battery and the like) by being converted into a direct current (DC).

Figure 2:
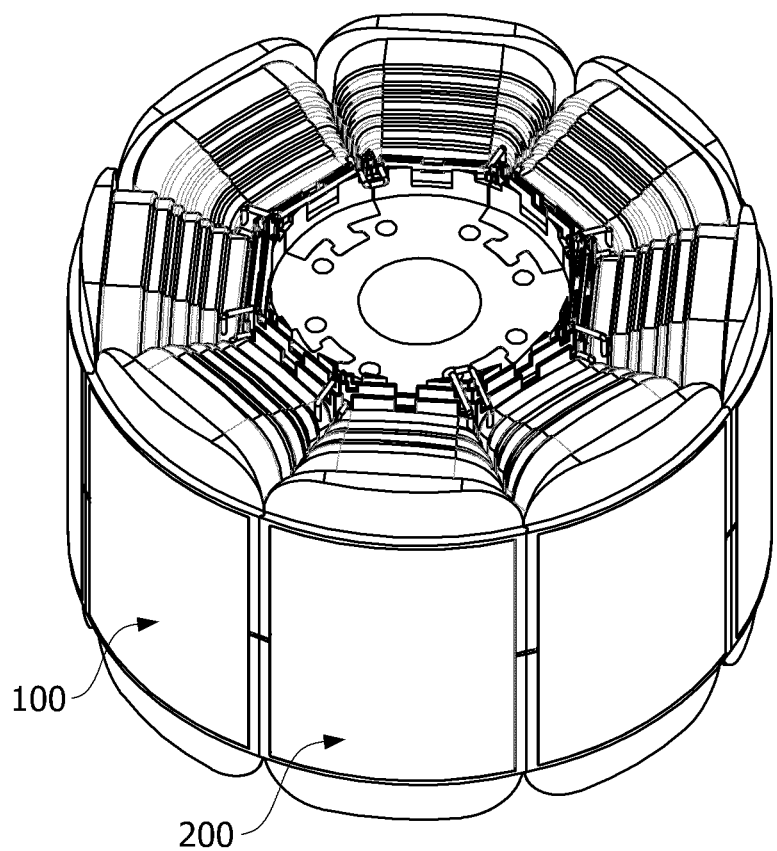
FIG. 2 is a view illustrating a rotor shown in FIG. 1.
Figure 3:
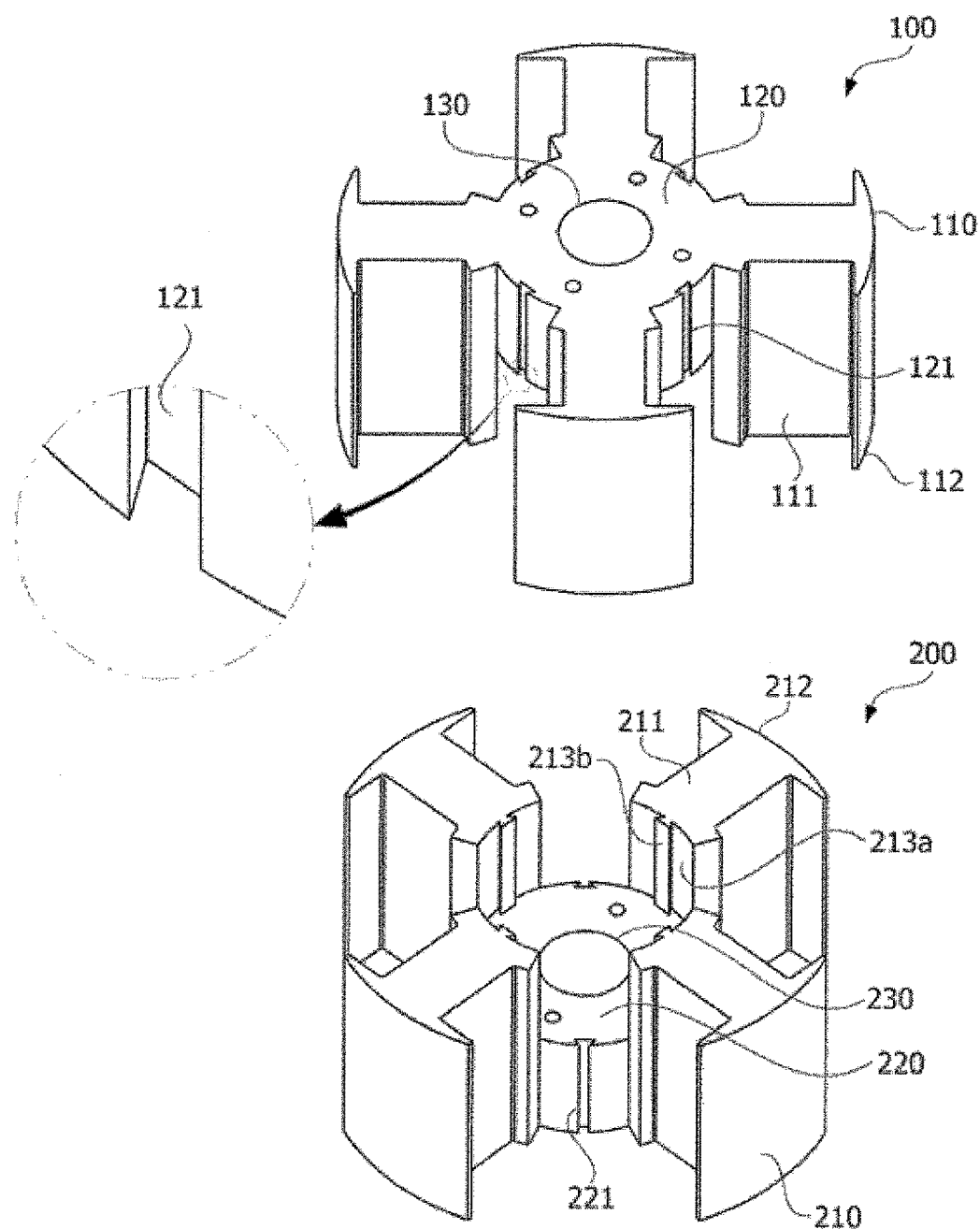
FIG. 3 is a view illustrating a first rotor core and a second rotor core.

FIG. 2 is a view illustrating the rotor shown in FIG. 1, and FIG. 3 is a view illustrating a first rotor core and a second rotor core. FIGS. 2 and 3 clearly illustrate only main characteristic portions for conceptually and clearly understanding the present disclosure. As a result, various modifications of the illustration are expected, and it is not necessary that the scope of the present disclosure be limited to specific shapes illustrated in the drawings.

As shown in FIGS. 2 and 3, the rotor 10 according to an embodiment may include a first rotor core 100 and a second rotor core 200. The first rotor core 100 and the second rotor core 200 form the rotor by being mutually stacked in a height direction. Each of the first rotor core 100 and the second rotor core 200 may be formed by stacking a plurality of plates. In this case, the first rotor core 100 is illustrated as being coupled onto the second rotor core 200.

Referring to FIG. 3, the first rotor core 100 may include first teeth 110. The first teeth 110 protrude from an outer circumferential surface of the first rotor core 100 in a radial direction. Coils are wound around the first teeth 110, and insulators may be installed on the first teeth 110. Here, the first teeth 110 may be disposed in a circumferential direction of a core body 120 in a cylindrical shape at regular intervals. A hole 130 into which the rotating shaft 50 is inserted may be formed in the center of the core body 120.

The first teeth 110 may include an arm-type body 111 connected to the core body 120 and a blocking protrusion 112 formed at a front end of the arm-type body 111. A coil is wound around the arm-type body 111. As shown in FIG. 3, all four of the first teeth 110 may be disposed at regular intervals. The number of the first teeth 110 may vary depending on the number of poles of the motor.

The second rotor core 200 may include second teeth 210. The second teeth 210 protrude from an outer circumferential surface of the second rotor core 200 in the radial direction. Further, the second teeth 210 may be disposed in a circumferential direction of a core body 220 in a cylindrical shape at regular intervals. A hole 230 into which the rotating shaft 50 is inserted may be formed in the center of the core body 220.

The second teeth 210 have the same shape as the shape of the first teeth 110. The second teeth 210 may include an arm-type body 211 connected to the core body 220 and a blocking protrusion 212 formed at a front end of the arm-type body 211. As shown in FIG. 3, all four of the second teeth 210 may be disposed at regular intervals. The number of the second teeth 210 may vary depending on the number of poles of the motor.

The first rotor core 100 and the second rotor core 200 are disposed so that the first rotor core 100 is disposed at a higher level than the second rotor core 200 and the second rotor core 200 is disposed at a lower level than the first rotor core 100 with respect to an axial center, and thus the respective teeth 110 and 210 may be stacked and coupled to each other in a complementary state.

Meanwhile, a first insulator 300 may be installed at the first teeth 110 for insulation. In addition, a second insulator 400 may also be installed at the second teeth 210 for insulation.

The first insulator 300 and the second insulator 400 serve to insulate so that coils wound around the first teeth 110 and the second teeth 210 are not conductive with the rotor 10. The first insulator 300 and the second insulator 400 may be formed of a resin material.

Figure 4:
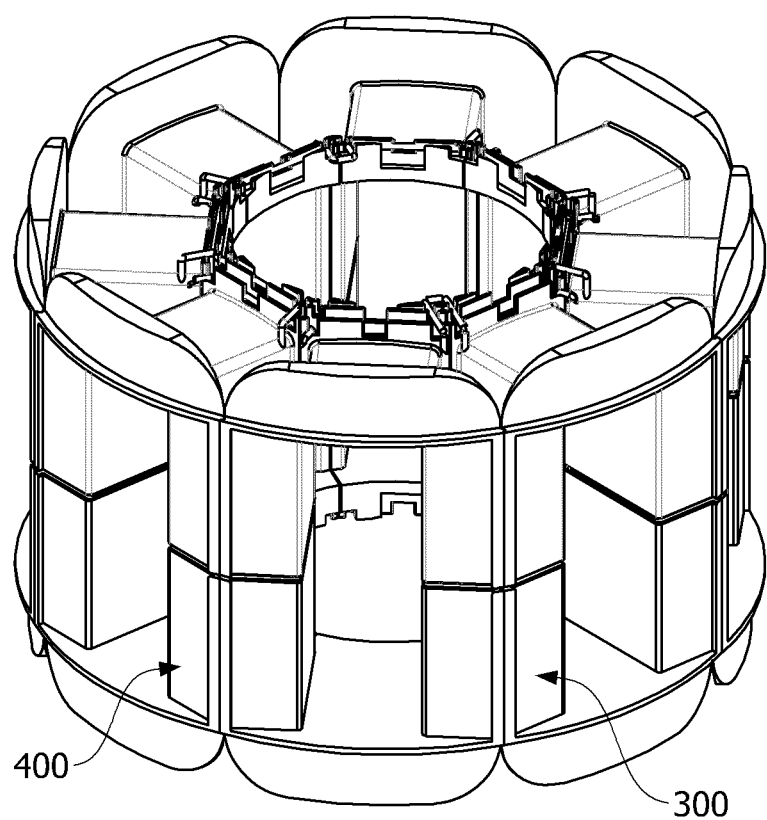
FIG. 4 is a view illustrating a first insulator and a second insulator.
Figure 5:
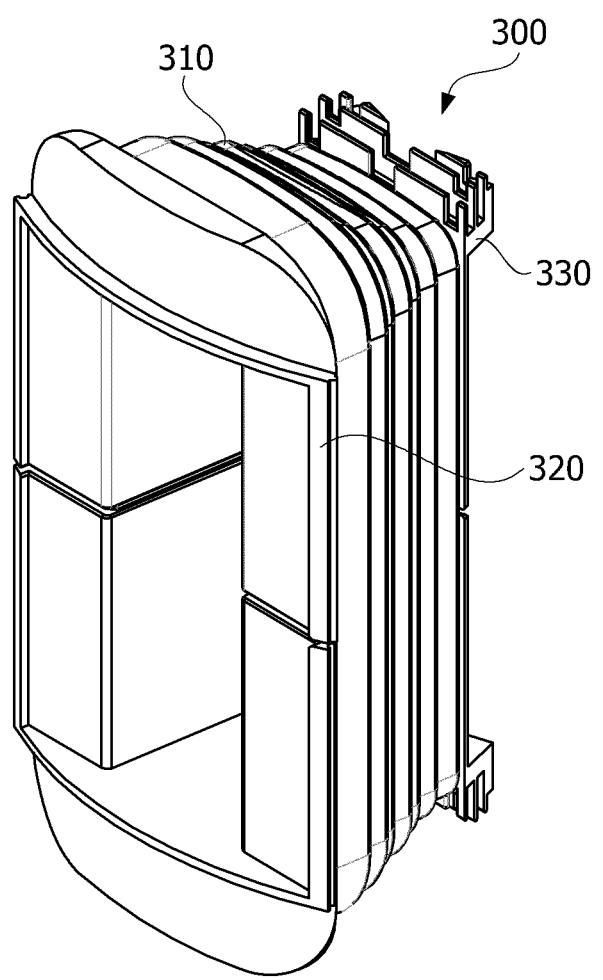
FIG. 5 is a view illustrating the first insulator.

Referring to FIGS. 4 and 5, the first insulator 300 may include a body 310, an outer guide 320, and an inner guide 330. The body 310 surrounds the first rotor core 100. A coil may be wound around the body 310. The outer guide 320 may be provided outside of the body 310. Also, the inner guide 330 may be provided inside of the body 310. Here, "outside" refers to the outside with respect to the body 310 in the radial direction from the center of rotation of the first rotor core 100, and "inside" refers to the inside with respect to the body 310 in the radial direction from the center of rotation of the first rotor core 100. The outer guide 320 serves to surround end portions of the first teeth 110. The configuration of the second insulator 400 is the same as that of the first insulator 300. The second insulator 300 may also include an outer guide 420.

Figure 6:
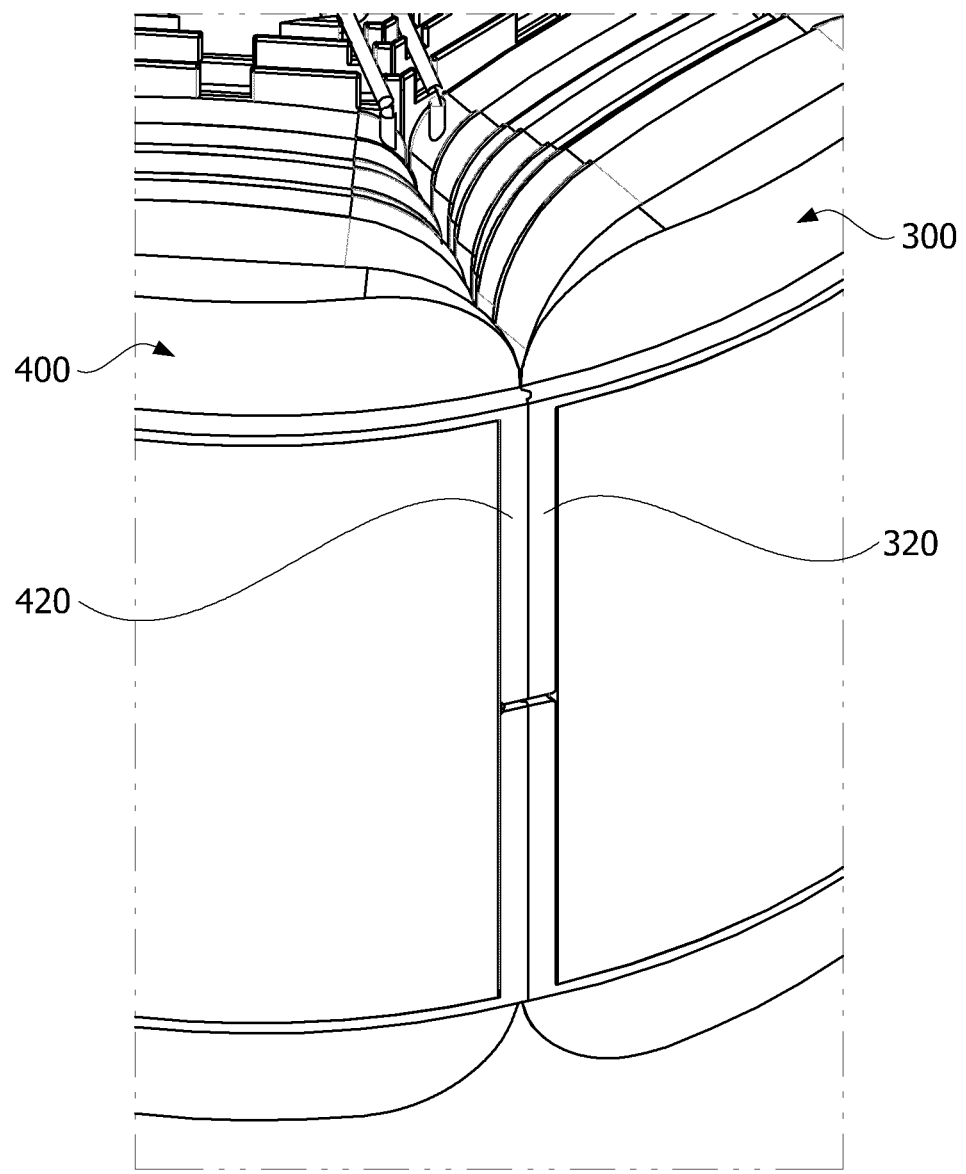
FIG. 6 is a view illustrating the first insulator and the second abutting each other.
Figure 7:
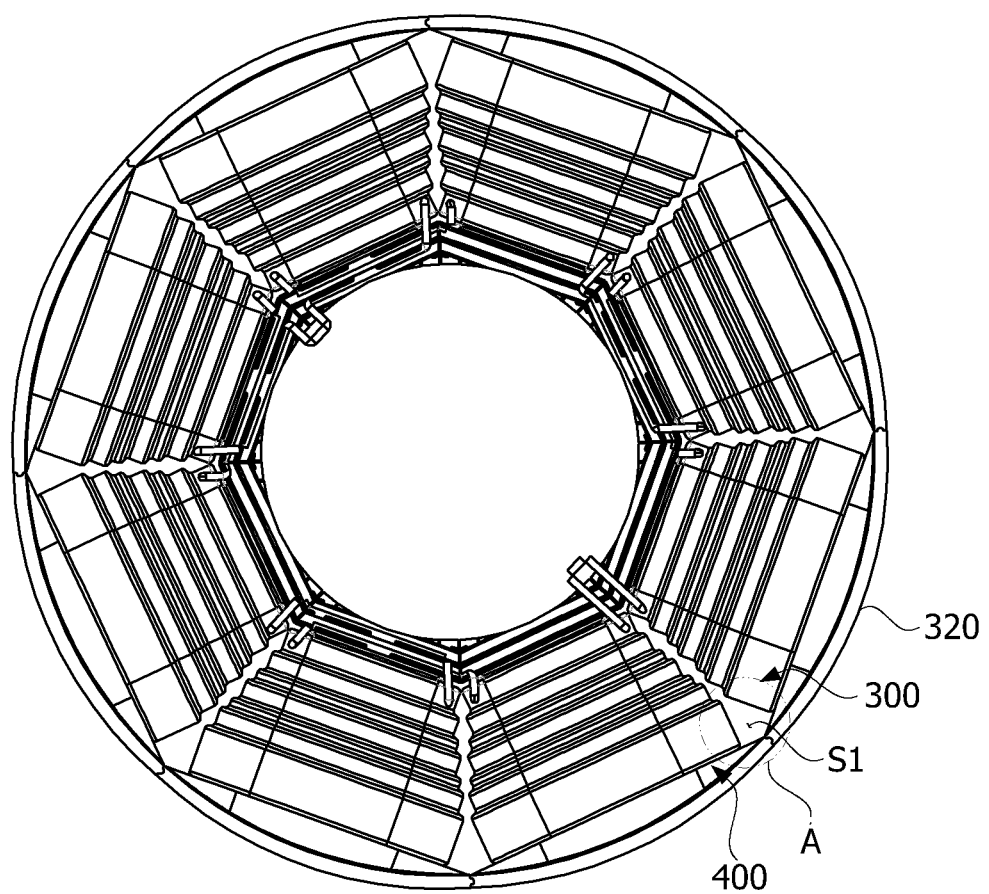
FIG. 7 is a view illustrating the first insulator and the second insulator blocking winding spaces.

Referring to FIG. 6, the outer guide 320 of the first insulator 300 and the outer guide 420 of the second insulator 400 may be formed to abut each other. When adjacent outer guides 320 and 420 abut each other, a winding space S1 is closed as illustrated in FIG. 7.

Originally, a space needs to be secured between outer guides of adjacent insulators. This is because the space is needed for inserting a nozzle that performs winding into the winding space S1. The space is configured to be filled by a separate cover member afterwards, and a coil is prevented from deviating outside the winding space S1 by a centrifugal force according to a rotation of the rotor. However, the separate cover member has to be assembled and thus there is a problem in that time and cost for production of a product are considerably increased.

Thus, a separate cover member is omitted in the rotor and the motor having the same according to the embodiment, and the outer guides 320 and 420 of adjacent insulators are configured to abut each other as a way which prevents a coil from deviating outside the winding space S1. This is because a space into which a nozzle is inserted does not have to be secured during a winding task since the winding task of the first rotor core 100 and the winding task of the second rotor core 200 are performed separately.

Figure 8:
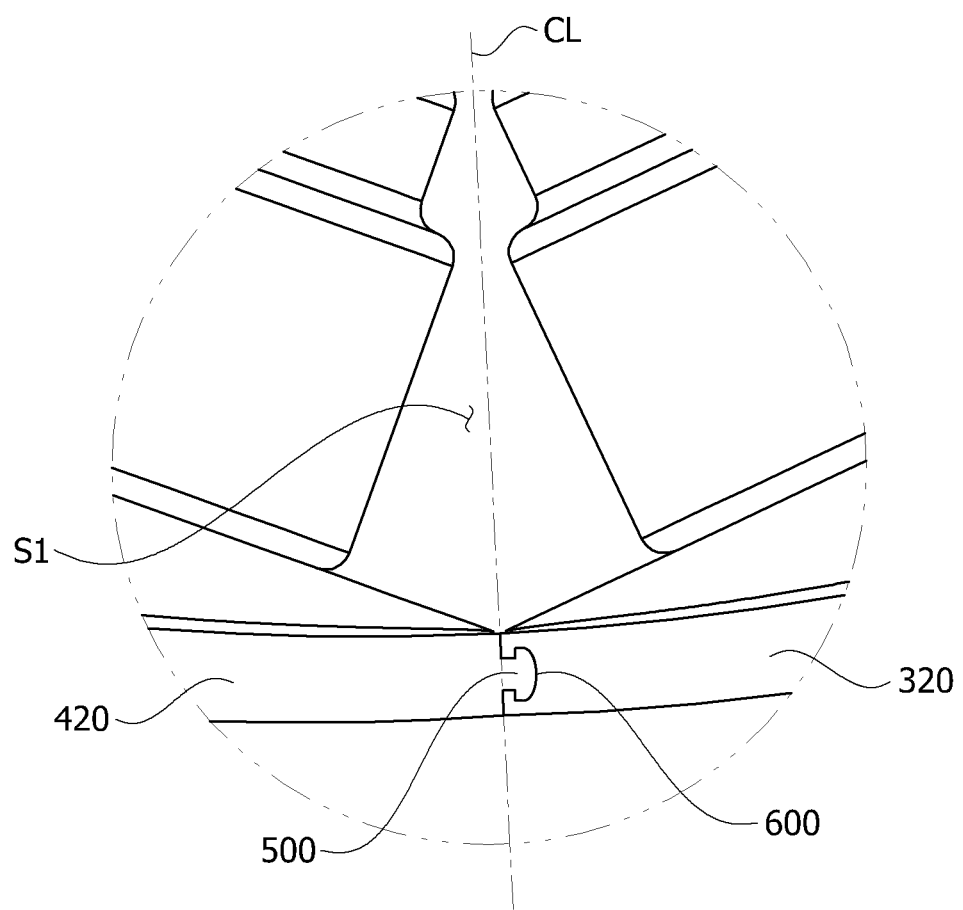
FIG. 8 is an enlarged view of region A in FIG. 7.

Referring to FIG. 8, side surfaces of the outer guide 320 of the first insulator 300 and the outer guide 420 of the second insulator 400 abut each other. Here, a convex region 500 may be formed at the side surface of the outer guide 320 of the first insulator 300. A concave region 600 corresponding to the convex region 500 may be formed at the side surface of the outer guide 420 of the second insulator 400.

The convex region 500 refers to a portion convexly protruding with respect to a virtual reference line CL passing through a contact surface between the first insulator 300 and the second insulator 400 in the radial direction from the center of rotation of the first rotor core 100 or the second rotor core 200, and the concave region 600 refers to a portion concavely protruding with respect to the reference line CL.

As an example of the convex region 500, a coupling protrusion 500 may be provided. In addition, a coupling slot 600 may be provided as the concave region 600. The coupling protrusion 500 may have a locking step structure formed at an end portion thereof, and the coupling slot 600 may also be formed to correspond to the locking step structure of the coupling protrusion 500. The coupling protrusion 500 may be coupled to the coupling slot 600 by being slid therein when the first rotor core 100 is coupled to the second rotor core 200. By an interlock between the coupling protrusion 500 and the coupling slot 600, the winding space S1 is closed, and coupling performance between the adjacent outer guides 320 and 420 is improved.

Figure 9:
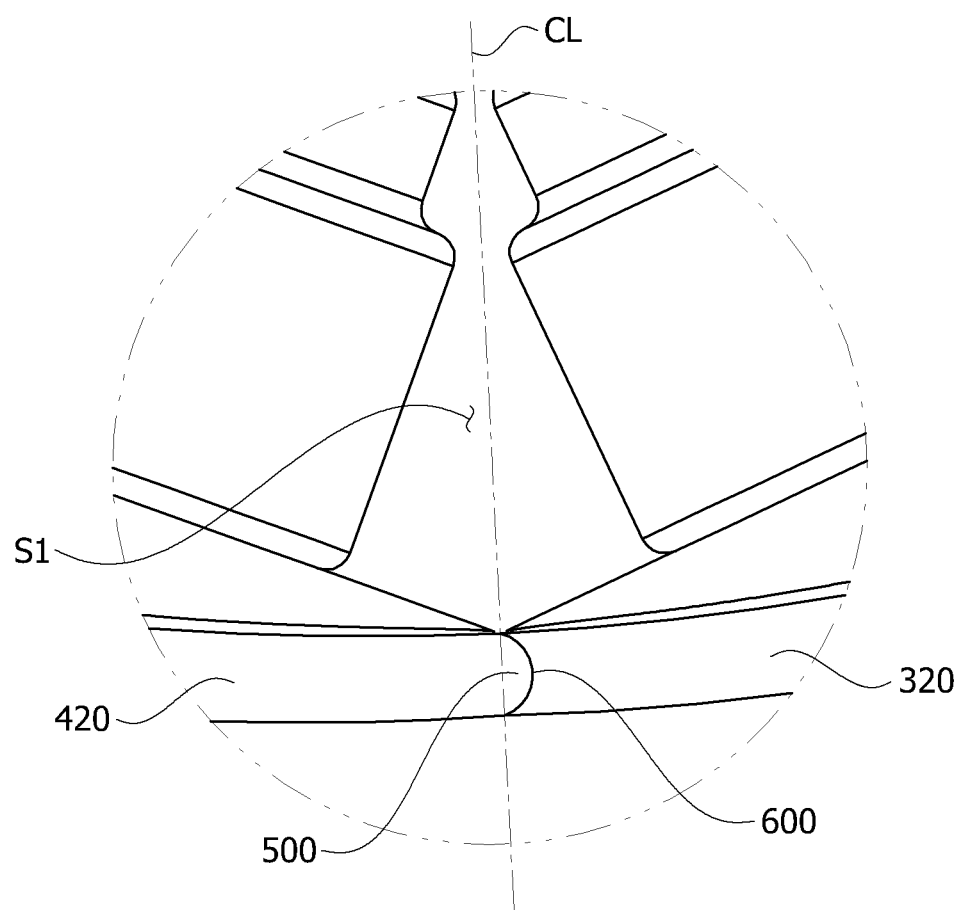
FIG. 9 is a view illustrating a first modified example of a contact surface between the first insulator and the second insulator.

Referring to FIG. 9, as another example of the convex region 500, the side surface of the first insulator 300 may be convexly formed in a curved shape with respect to the reference line CL. In addition, the concave region 600 may be concavely formed corresponding to the convex region 500 in the curved shape.

Figure 10:
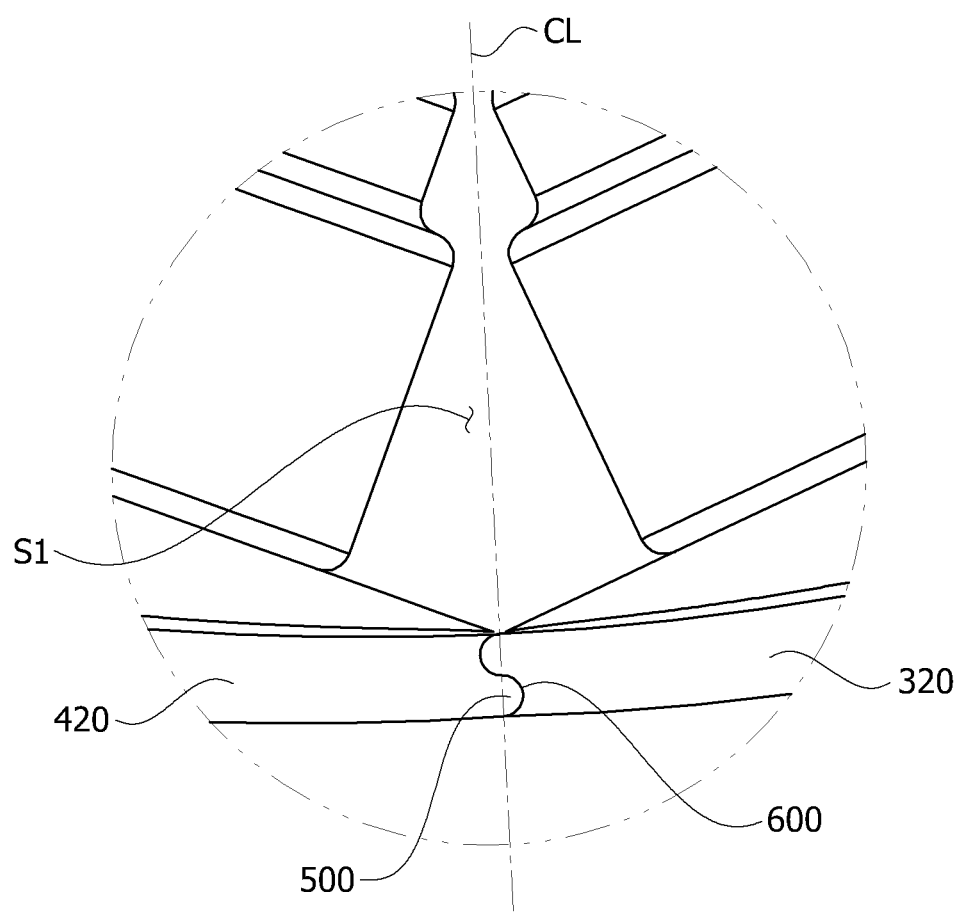
FIG. 10 is a view illustrating a second modified example of the contact surface between the first insulator and the second insulator.

FIG. 10 is a view illustrating a second modified example of the contact surface between the first insulator and the second insulator. As another example of the convex region 500 and the concave region 600, a region convexly formed in a curved shape and a region concavely formed in a curved shape with respect to the reference line CL may be alternately formed.

Figure 11:
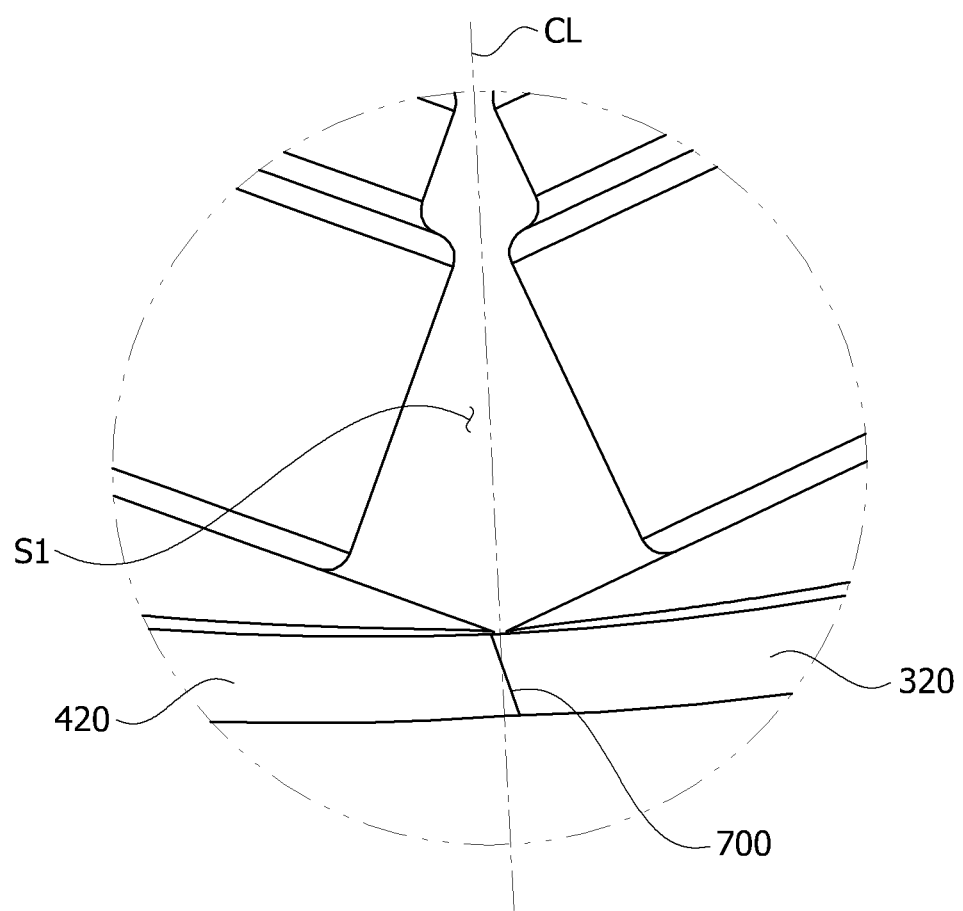
FIG. 11 is a view illustrating a third modified example of the contact surface between the first insulator and the second insulator.

FIG. 11 is a view illustrating a third modified example of the contact surface between the first insulator and the second insulator. A contact surface 700 between the first insulator 300 and the second insulator 400 may be formed to be inclined. That is, the side surfaces of the outer guides 320 and 420 may be obliquely disposed so that the contact surface 700 forms a predetermined angle with the reference line CL.

Figure 12:
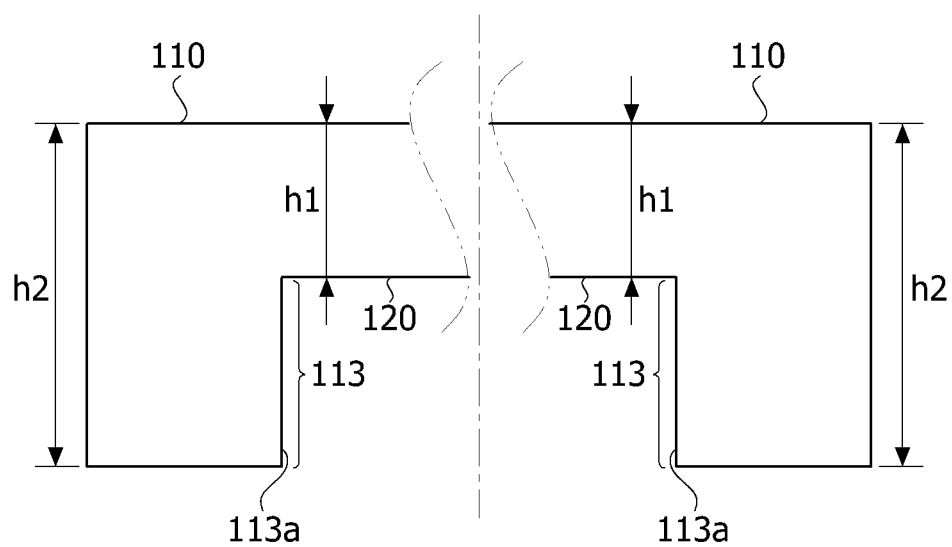
FIG. 12 is a view illustrating a first extension.
Figure 13:
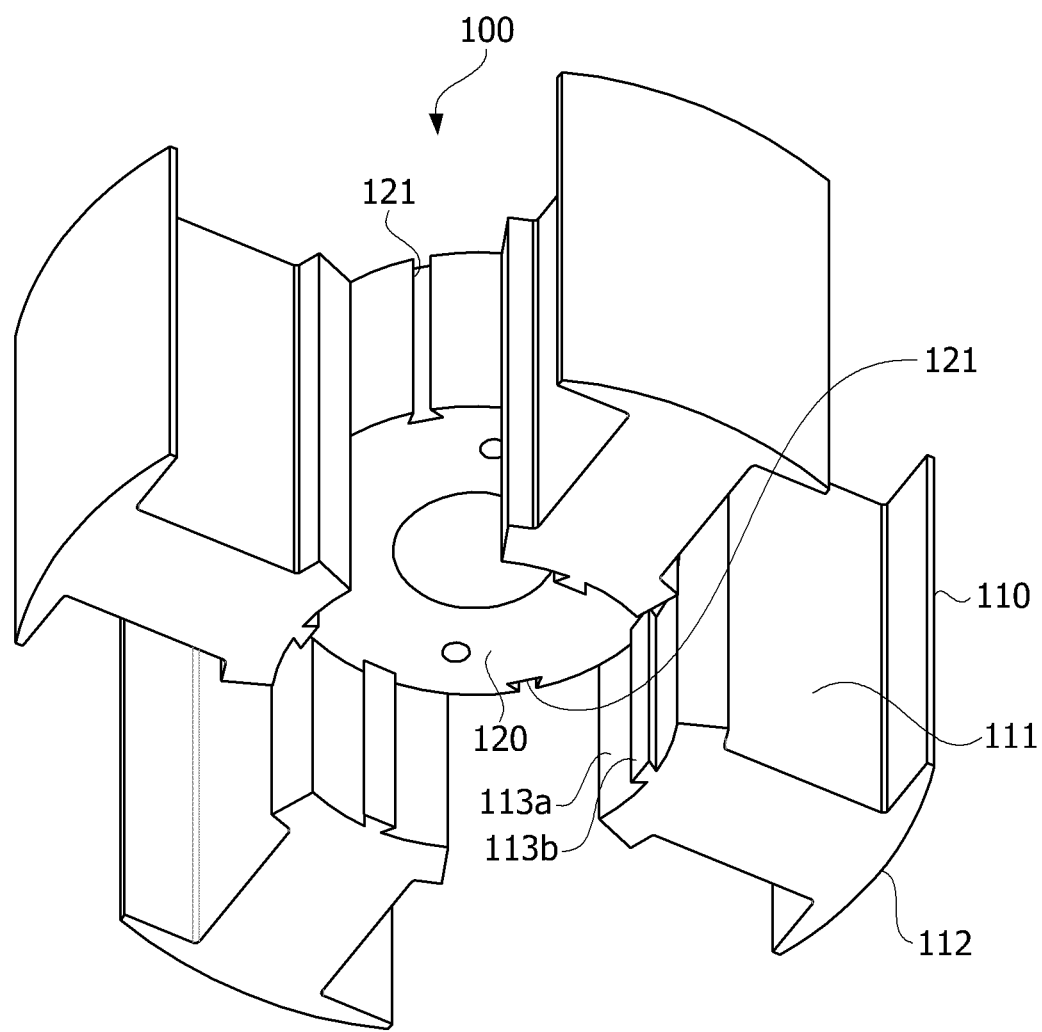
FIG. 13 is a bottom view of the first extension.

Referring to FIGS. 3, 12, and 13, a height h2 of the first teeth 110 is formed to be greater than a height h1 of the core body 120 in the cylindrical shape. Here, "height" is based on an axial direction of the motor. For example, the first teeth 110 may include a first extension 113 protruding downward past the core body 120. The first extension 113 is a portion from which the first teeth 110 extend and to which the core body 220 of the second teeth 210 is coupled.

The first extension 113 may include a slide edge part 113a having a curved inner circumferential surface aligned with an outer circumferential surface of the core body 220 of the second rotor core 200. The inner circumferential surface of the slide edge part 113a slidably comes into contact with the outer circumferential surface of the core body 220.

Meanwhile, a first slide protrusion 113b may be formed at the inner circumferential surface of the slide edge part 113a in the axial direction. The first slide protrusion 113b is inserted into a second slide groove 221 formed in the core body 220 of the second rotor core 200 so that the first rotor core 100 and the second rotor core 200 may be coupled to each other. A first slide groove 121 may be formed in an outer circumferential surface of the core body 120 of the first extension 113 in the axial direction.

Figure 14:
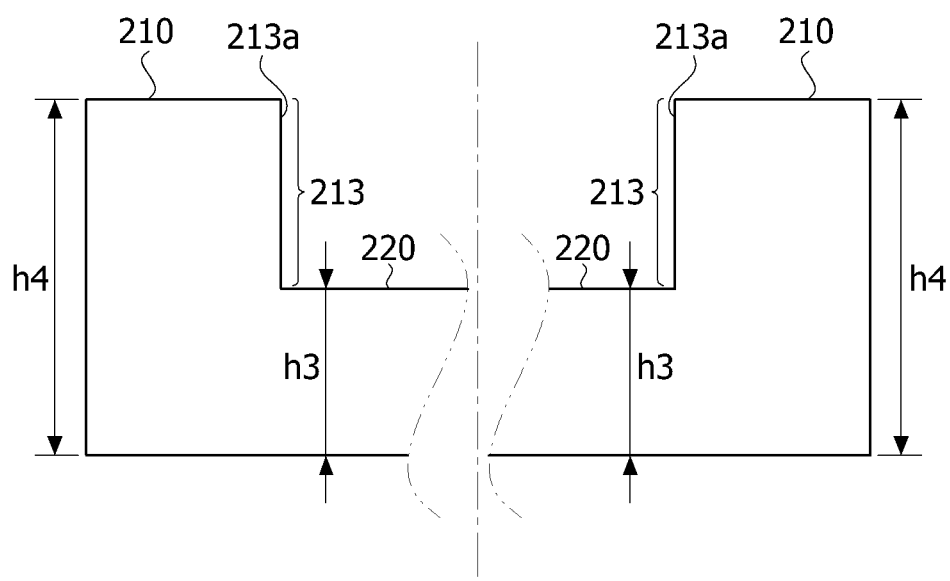
FIG. 14 is a view illustrating a second extension.

Referring to FIG. 14, a height h4 of the second teeth 210 is formed to be greater than a height h3 of the core body. For example, the second teeth 210 may include a second extension 213 protruding upward past the core body 220. The second extension 213 is a portion from which the second teeth 210 extend and to which the core body 120 of the first teeth 110 is coupled.

Referring to FIGS. 3 and 14, the second extension 213 may include a slide edge part 213a having a curved inner circumferential surface aligned with the outer circumferential surface of the cylindrical core body 120 of the first rotor core 100. The inner circumferential surface of the slide edge part 213a slidably comes in contact with the outer circumferential surface of the core body 120 of the first teeth 110.

Figure 15:
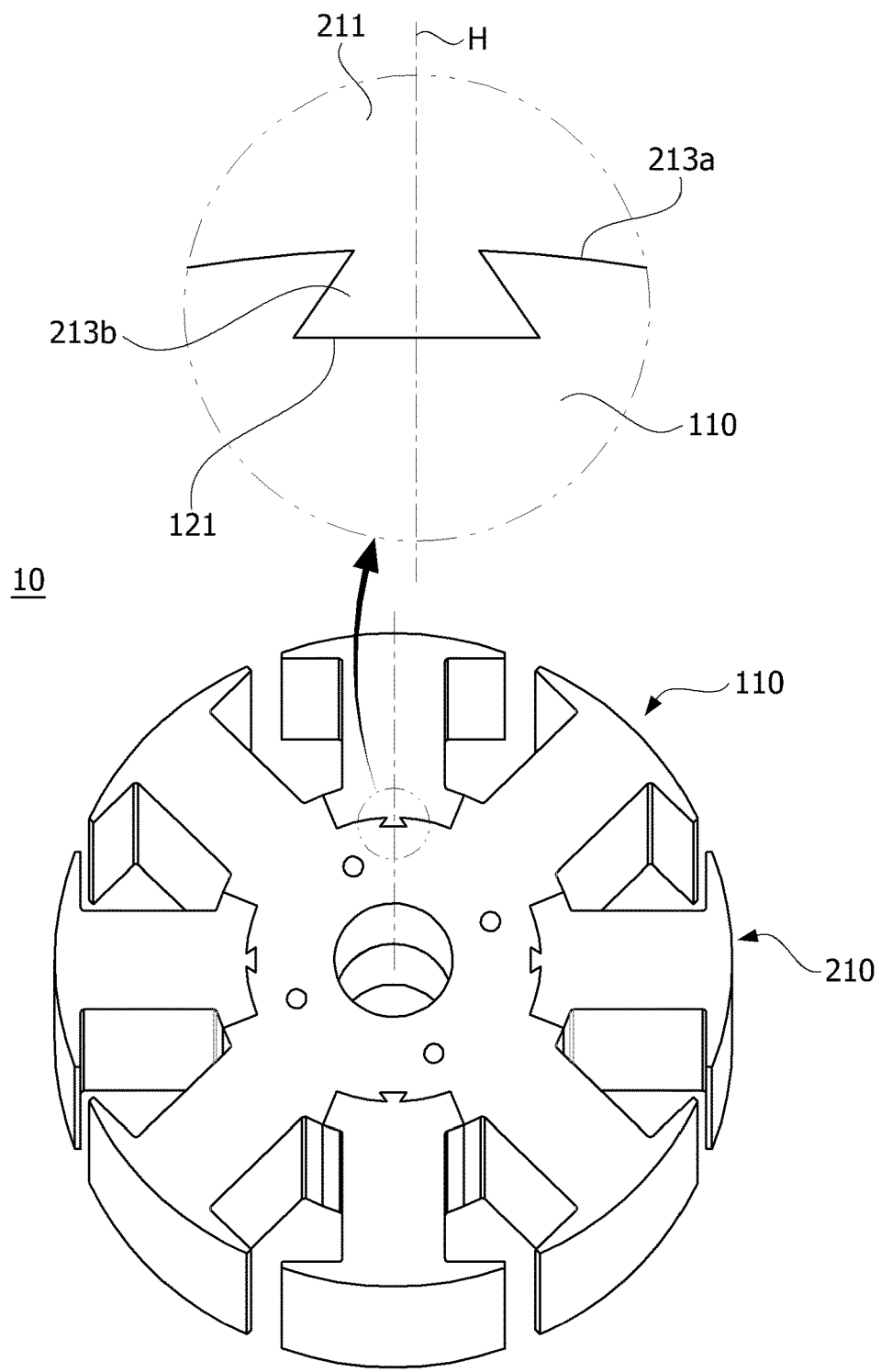
FIG. 15 is a view illustrating a rotor in which the first rotor core and the second rotor core are coupled to each other.

Referring to FIG. 15, a second slide protrusion 213b may be formed from the inner circumferential surface of the slide edge part 213a in the axial direction. The second slide protrusion 213b is inserted into the first slide groove 121 formed in the cylindrical core body 120 of the first rotor core 100 so that the first rotor core 100 and the second rotor core 200 may be coupled to each other. The second slide groove 221 may be formed in the outer circumferential surface of the core body 220 of the second extension 213 in the axial direction.

Referring to FIGS. 3 and 15, the first rotor core 100 and the second rotor core 200 are coupled to form the rotor 10 so that the first teeth 110 and the second teeth 210 are alternately disposed with respect to a circumferential direction. To this end, the first teeth 110 and the second teeth 210 may be alternately disposed in the circumferential direction when the first rotor core 100 and the second rotor core 200 are coupled to each other.

As shown in FIG. 15, the second slide protrusion 213b of the second teeth 210 may be formed with respect a reference line H passing through the center of a width direction of the slide edge part 213a in the radial direction. Although not illustrated, the first slide protrusion 113b of the first protrusion 110 may also be formed with respect to a reference line passing through the center of a width direction of the slide edge part 113a in the radial direction.

The slide protrusions 213a and 213b may be formed so that widths thereof decrease from tip end portions to root portions and may be formed so that a mutual binding force is generated between the first rotor core 100 and the second rotor core 200 with respect to the radial direction.

Figure 16:
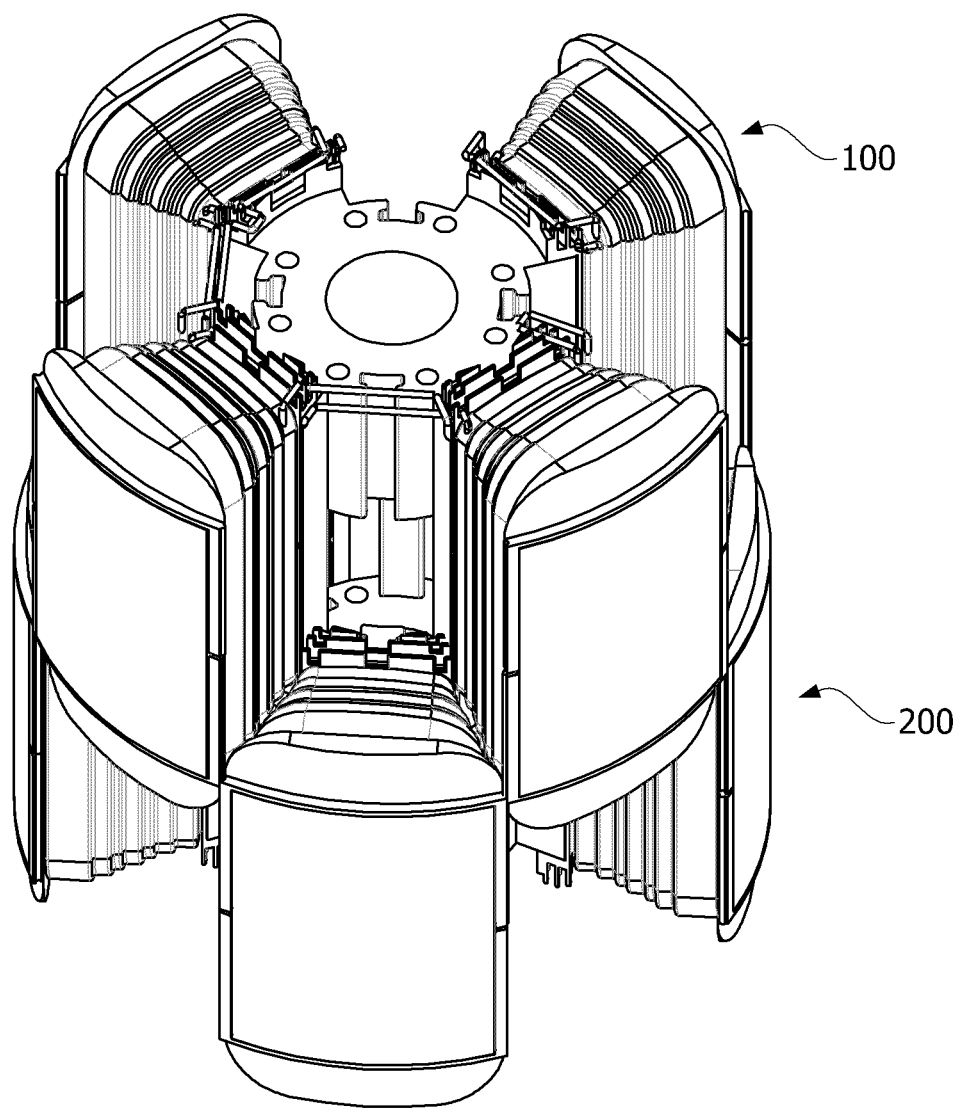
FIG. 16 is a view illustrating a state in which a coil is wound around each of the first rotor core and the second rotor core.

As shown in FIG. 16, the first rotor core 100 and the second rotor core 200 may be assembled with each other after coils are wound therearound. Because gaps between the teeth around which the coils are wound are wide compared to when there is one rotor core, a space factor of the coils may be remarkably increased. Also, a task of winding the coils may be more easily performed. Particularly, since the winding task of the first rotor core 100 and the winding task of the second rotor core 200 are separately performed, a space into which a nozzle is inserted does not have to be secured during the winding tasks.

Figure 17:
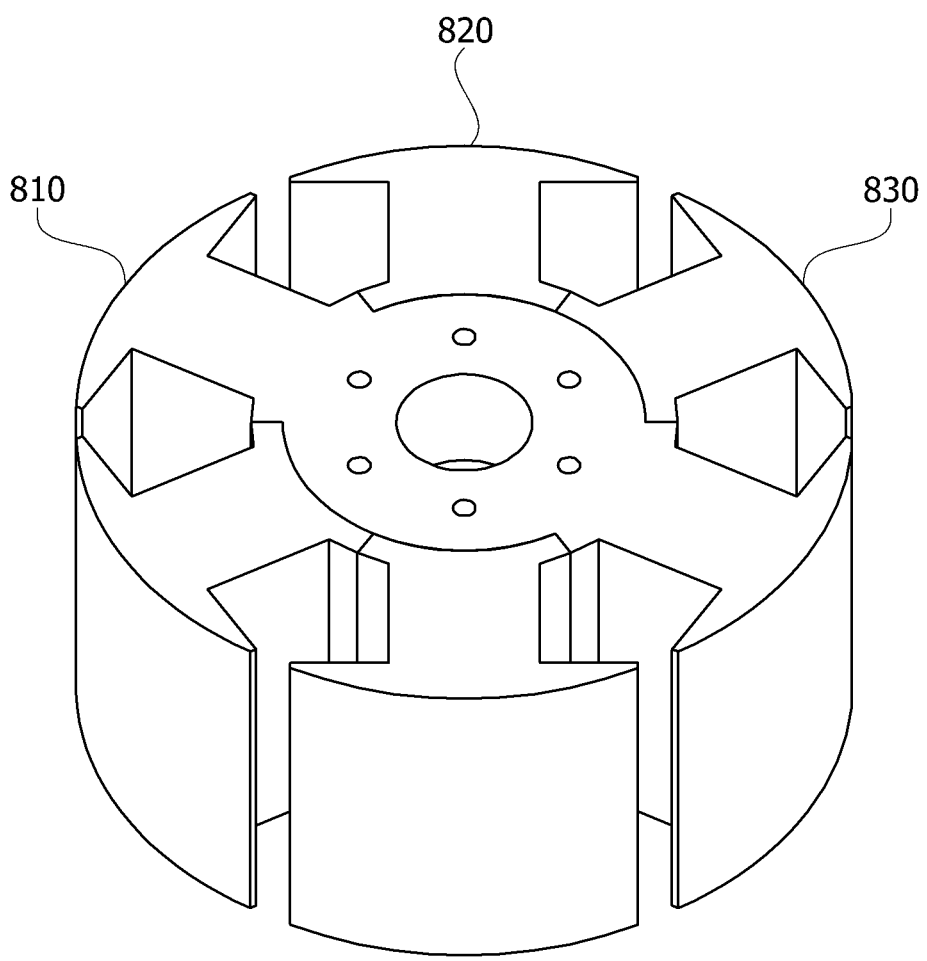
FIG. 17 is a view illustrating a rotor according to another embodiment.
Figure 18:
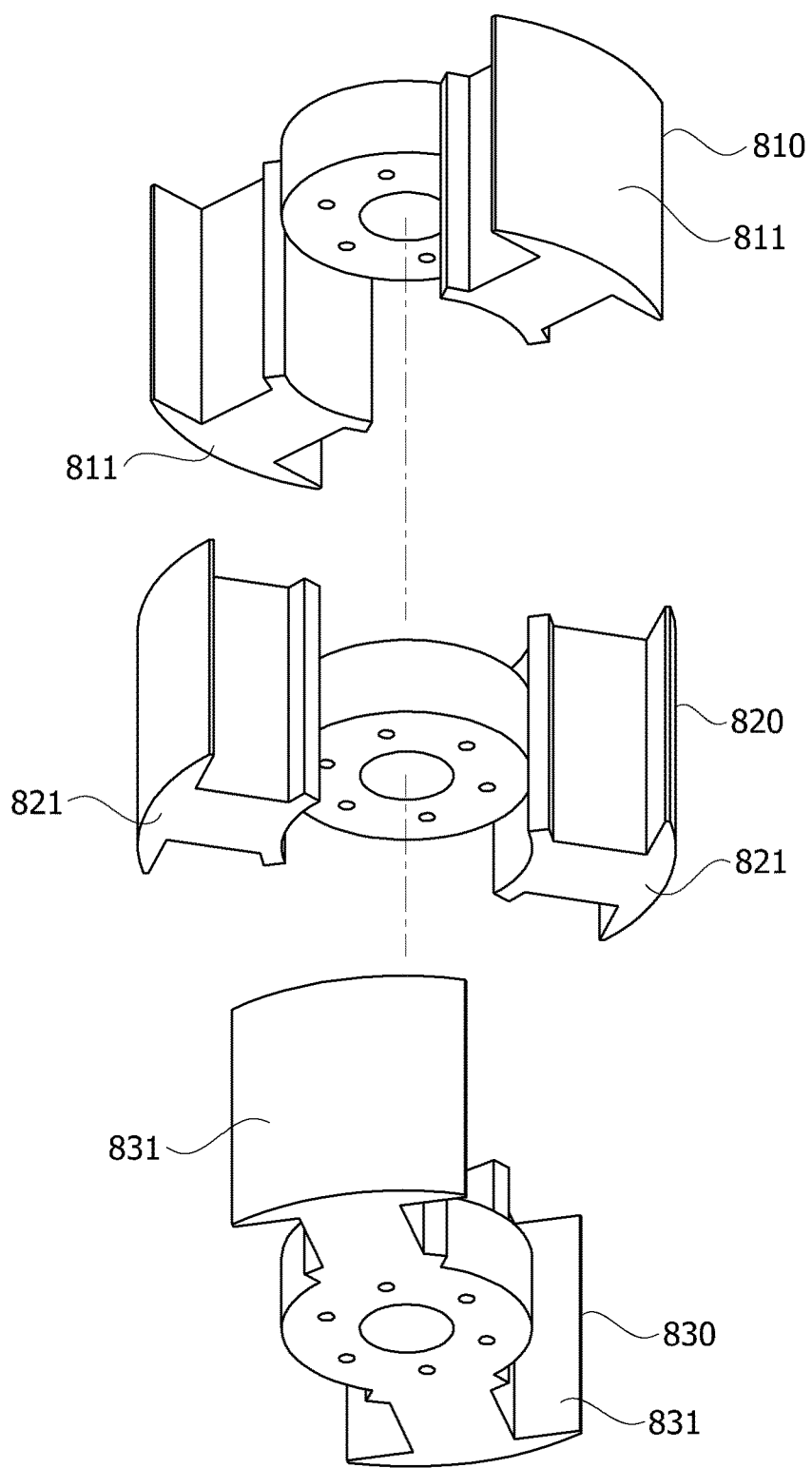
FIG. 18 is an exploded view of the rotor shown in FIG. 17.

Referring to FIGS. 17 and 18, a rotor 10 according to another embodiment may include three rotor cores 810, 820, and 830. Two teeth 811, two teeth 821, and two teeth 831 may be formed at the rotor cores 810, 820, and 830, respectively. Each of the teeth 811, 821, and 831 may be alternately disposed with respect to a circumferential direction, and the three rotor cores 810, 820, may be stacked and coupled to each other to have a concentric axis. The respective teeth 811, 821 and 831, which have the same functions and structures as those of the teeth 110 and 210 described above, are portions around which coils are wound.

Figure 19:
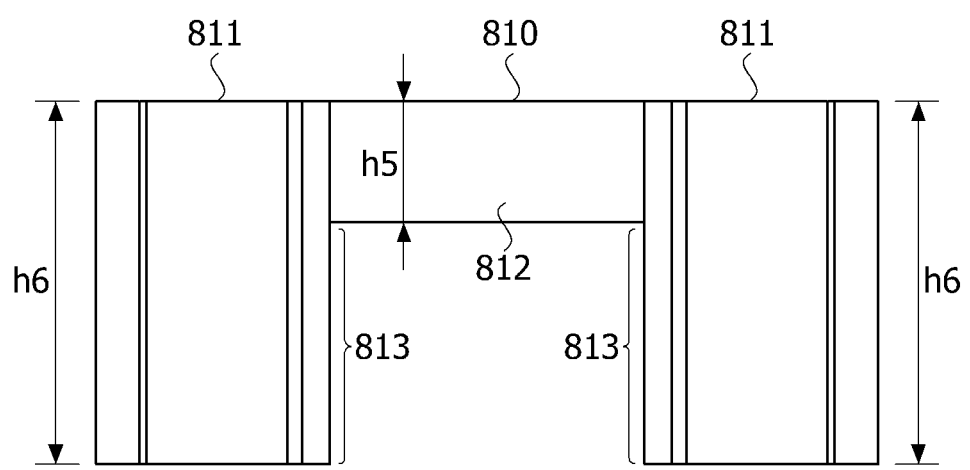
FIG. 19 is a view illustrating a first rotor core of the rotor shown in FIG. 18.
Figure 20:
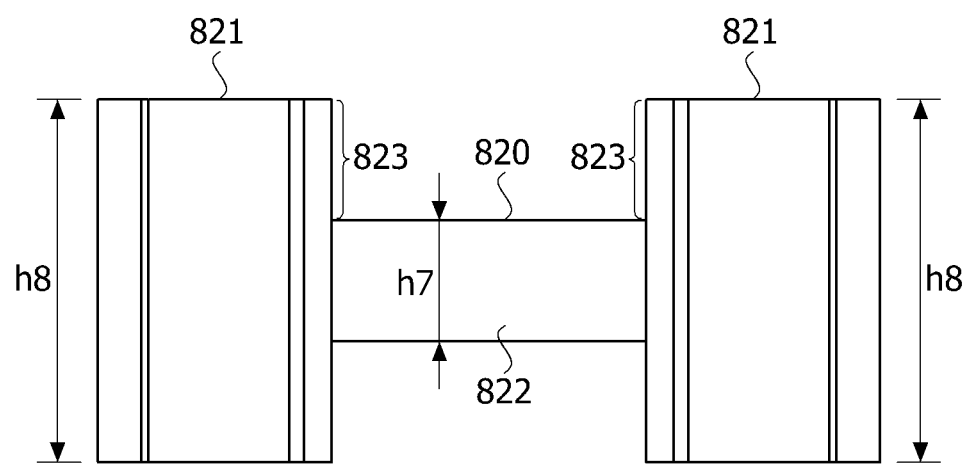
FIG. 20 is a view illustrating a second rotor core of the rotor shown in FIG. 18.
Figure 21:
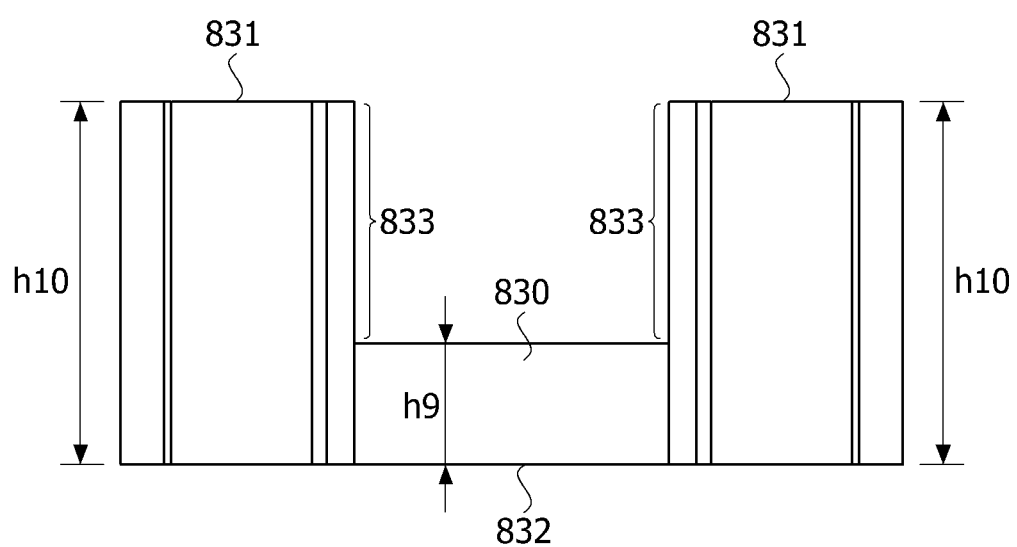
FIG. 21 is a view illustrating a third rotor core of the rotor shown in FIG. 18.

Referring to FIGS. 19 to 21, the first rotor core 810 refers to a rotor core disposed as the top of the three rotor cores. A height h6 of the first teeth 811 of the first rotor core 810 is formed to be greater than a height h5 of a core body 812. Specifically, the first teeth 811 include a first extension 813. The first extension 813 may be formed to be downwardly long so that the first extension 813 may come into contact with an outer circumferential surface of a core body 822 of the second rotor core 820 and an outer circumferential surface of a core body 832 of the third rotor core 830, which are disposed under the first rotor core 810. For example, the height h6 of the first teeth 811 may be formed to correspond to an entire height of the rotor 10.

Referring to FIG. 20, the second rotor core 820 refers to a rotor core disposed in the middle of the three rotor cores. A height h8 of the second teeth 821 of the second rotor core 820 is formed to be greater than a height h7 of the core body 822. Specifically, the second teeth 821 may include a second extension 823. The second extension 823 may be formed to be downwardly and upwardly long so that the second extension 823 may come into contact with an outer circumferential surface of the core body 822 of the first rotor core 810 in an upward direction and come into contact with the outer circumferential surface of the core body 822 of the third rotor core 830 in a downward direction. For example, the height h8 of the second teeth 821 may be formed to correspond to the entire height of the rotor 10.

Referring to FIG. 21, the third rotor core 830 refers to a rotor core disposed as the bottom of the three rotor cores. A height h10 of the third teeth 831 of the third rotor core 830 is formed to be greater than a height h9 of the core body 832. Specifically, the third teeth 831 may be formed to be upwardly long so that a third extension 833 may come into contact with the outer circumferential surface of the core body 832 of the second rotor core 820 and come into contact with the outer circumferential surface of the core body 832 of the first rotor core 810, which are disposed above the third rotor core 830. For example, the height h10 of the third teeth 831 may be formed to correspond to the entire height of the rotor 10. The respective heights h5, h7 and h9 of the core bodies 812, 822 and 832 of the rotor cores 810, 820 and 830 may be formed to be the same.

According to an embodiment, since winding tasks are separately performed for each of a plurality of rotor cores, winding spaces are closed by outer guides of insulators so that coils do not deviate from the winding spaces without having to secure spaces into which nozzles for the winding tasks are inserted such that separate members for filling the spaces into which the nozzles are inserted can be omitted and thus a manufacturing time and a manufacturing process can be reduced.

In addition, according to an embodiment, unlike a rotor in which teeth, around which coils are wound, are integrally formed, coils can be wound around divided teeth in which relatively wide winding spaces are secured such that a space factor of a coil increases and winding tasks are eased.

The rotor according to a an exemplary embodiment of the present disclosure and the motor having the same have been described above in detail with reference to the accompanying drawings.

The embodiments may be directed to a rotor capable of having increased torque by increasing a space factor of a coil and easing assembly thereof, and a motor having the same. The embodiments may be also directed to a rotor capable of having a reduced manufacturing time and manufacturing cost by removing a member that blocks an inlet of a nozzle between teeth of the rotor, and a motor having the same.

According to an aspect of the present disclosure, a rotor may include a first rotor core having first teeth protruding from an outer circumferential surface thereof, a second rotor core disposed at a different position from the first teeth with respect to a circumferential direction when stacked on and coupled to the first rotor core and having second teeth protruding from an outer circumferential surface thereof, a first insulator having a body that surrounds the first teeth and a first outer guide formed at an outside of the body with respect to a radial direction of the first rotor core, and a second insulator having a body that surrounds the second teeth and a second outer guide formed at an outside of the body with respect to a radial direction of the second rotor core, wherein, when the first rotor core and the second rotor core are coupled to each other by stacking, the first outer guide and the second outer guide are formed to abut each other.

A contact surface between the first outer guide and the second outer guide may be formed to be inclined with respect to a reference line that passes through the contact surface in the radial direction from a center of rotation of the first rotor core and the second rotor core.

On the contact surface between the first outer guide and the second outer guide, a convex region and a concave region may be alternately formed with respect to the reference line that passes through the contact surface in the radial direction from the center of rotation of the first rotor core and the second rotor core.

A coupling protrusion may be formed at a side surface of the first outer guide facing the second outer guide, and a coupling slot into which the coupling protrusion is inserted may be formed at a side surface of the second outer guide facing the first outer guide.

The coupling protrusion may be formed along an axial direction of the first rotor core and the second rotor core and be slidably coupled to the coupling slot.

The first teeth may include a first extension that protrudes past a lower surface of the first rotor core, and the second teeth may include a second extension that protrudes past an upper surface of the second rotor core.

The first extension and the second extension may each include a slide edge part formed at an inner end portion.

The slide edge part may include a slide protrusion protruding and disposed in a height direction, and the first rotor core and the second rotor core may each include a slide groove concavely formed at an outer circumferential surface thereof and disposed in the height direction.

The slide edge part may include a slide groove concavely formed and disposed in the height direction, and the first rotor core and the second rotor core may each include a slide protrusion protruding at the outer circumferential surface thereof and disposed in the height direction.

The slide protrusion or the slide groove may be disposed in a center of the slide edge part with respect to a circumferential direction.

The slide protrusion may have a width decreasing from an inner side thereof toward an outer side thereof, and the slide groove may have a width increasing from an inner side thereof toward an outer side thereof.

The slide edge part of the first rotor core may have an inner circumferential surface corresponding to the outer circumferential surface of the second rotor core, and the slide edge part of the second rotor core may have an inner circumferential surface corresponding to the outer circumferential surface of the first rotor core.

The slide protrusion or the slide groove may be formed at an inner circumferential surface of the slide edge part.

According to another aspect of the present disclosure, there is provided a motor which includes a stator, a rotor including a first rotor core disposed in the stator and including first teeth protruding from an outer circumferential surface thereof, a second rotor core disposed at a different position from the first teeth with respect to a circumferential direction when stacked on and coupled to the first rotor core and having second teeth protruding from an outer circumferential surface thereof, a first insulator having a body that surrounds the first teeth and a first outer guide formed at an outside of the body with respect to a radial direction of the first rotor core, and a second insulator having a body that surrounds the second teeth and a second outer guide formed at an outside of the body with respect to a radial direction of the second rotor core, wherein, when the first rotor core and the second rotor core are coupled to each other by stacking, the first outer guide and the second outer guide are formed to abut each other, and a rotating shaft is coupled to the rotor.

A contact surface between the first outer guide and the second outer guide may be formed to be inclined with respect to a reference line that passes through the contact surface in the radial direction from a center of rotation of the first rotor core and the second rotor core.

On the contact surface between the first outer guide and the second outer guide, convex regions and concave regions may be alternately formed with respect to a reference line that passes through the contact surface in the radial direction from the center of rotation of the first rotor core and the second rotor core.

A coupling protrusion may be formed at a side surface of the first outer guide that faces the second outer guide, and a coupling slot into which the coupling protrusion is inserted may be formed at a side surface of the second outer guide that faces the first outer guide.

The coupling protrusion may be formed along the axial direction of the first rotor core and the second rotor core and be slidably coupled to the coupling slot.

Hereinafter, exemplary embodiments of the present disclosure will be described in detail with reference to the accompanying drawings. Purposes, specific advantages, and novel features of the disclosure should be made clearer from exemplary embodiments and the following detailed descriptions in connection with the accompanying drawings. Terms and words used in this specification and claims are not to be interpreted as limited to commonly used meanings or meanings in dictionaries and should be interpreted as having meanings and concepts which are consistent with the technological scope of the disclosure with respect to the principle that the inventors have appropriately defined concepts of terms in order to describe the disclosure in the best way. In the description of the present disclosure, when it is determined that related well-known technologies unnecessarily obscure the gist of the present disclosure, the detailed descriptions thereof will be omitted.

Although the terms "first," "second," etc. may be used herein to describe various elements, these elements are not limited by these terms. These terms are only used to distinguish one element from another. For example, a first element could be termed a second element, and similarly, a second element could be termed a first element, without departing from the scope of the present disclosure. The term "and/or" includes any and all combinations of one or more of the associated listed items.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art

DESCRIPTION OF SYMBOL

10: ROTOR
50: ROTATING SHAFT
100,810: FIRST ROTOR CORE
110,811: FIRST TEETH
111,211: ARM-TYPE BODY
112,212: BLOCKING PROTRUSION
113,813: FIRST EXTENSION
113a,213a: SLIDE EDGE PART
113B: SLIDE PROTRUSION
120,220,812,822,832: CORE BODY
121,221: SLIDE GROOVE
200,820: SECOND ROTOR CORE
210,821: SECOND TEETH
213,823: SECOND EXTENSION
300: FIRST INSULATOR
310: BODY
320,420: OUTER GUIDE
330: INNER GUIDE
400: SECOND INSULATOR
500: CONVEX REGION
600: CONCAVE REGION
830: THIRD ROTOR CORE
831: THIRD TEETH
833: THIRD EXTENSION

What is claimed is:

1. A rotor comprising:
a first rotor core and a second rotor core that are axially stacked;
a first insulator coupled to the first rotor core; and
a second insulator coupled to the second rotor core, wherein:
the first rotor core includes a first core body, a first outer circumferential surface, and first teeth protruding from the first outer circumferential surface;
the second rotor core includes a second core body, a second outer circumferential surface, and second teeth protruding from the second outer circumferential surface;
the first insulator includes a body configured to surround the first teeth and a first outer guide formed at an outside of the body with respect to a radial direction of the first rotor core;
the second insulator includes a body configured to surround the second teeth and a second outer guide formed at an outside of the body with respect to a radial direction of the second rotor core; and
the first outer guide and the second outer guide are configured to abut each other,
wherein each of the first teeth includes a first extension protruding axially in a first direction past a first surface of the first core body, and each of the second teeth includes a second extension protruding axially in a second direction opposite the first direction past a first surface of the second core body,
wherein a first inner circumferential surface of the first extension is in contact with an outer circumferential surface of the second core body,
wherein a first inner circumferential surface of the second extension is in contact with an outer circumferential surface of the first core body,
wherein the first extension includes a first slide protrusion provided on the first inner circumferential surface of the first extension, the first slide protrusion comprising a second inner circumferential surface spaced apart radially inward from the first inner circumferential surface of the first extension, and the first core body includes a first slide groove provided on the outer circumferential surface of the first core body,
wherein the second extension includes a second slide protrusion provided on the first inner circumferential surface of the second extension, the second slide protrusion comprising a second inner circumferential surface spaced apart radially inward from the first inner circumferential surface of the second extension, and the second core body includes a second slide groove provided on the outer circumferential surface of the second core body, and wherein the first slide protrusion is configured to be inserted into the second slide groove, and the second slide protrusion is configured to be inserted into the first slide groove.

2. The rotor of claim 1, wherein a contact surface between the first outer guide and the second outer guide is formed to be inclined.

3. The rotor of claim 1, wherein a contact surface between the first outer guide and the second outer guide includes a convex region and a concave region.

4. The rotor of claim 1, wherein a coupling protrusion is formed at a contact surface of the first outer guide facing the second outer guide, and a coupling slot into which the coupling protrusion is configured to be inserted is formed at a contact surface of the second outer guide facing the first outer guide.

5. The rotor of claim 1, wherein the first slide groove, the second slide groove, the first slide protrusion, and the second slide protrusion extend along the axial direction, respectively.

6. The rotor of claim 5, wherein the first slide protrusion is provided at the center of the first inner circumferential surface of the first extension in a circumferential direction, and the second slide groove is provided at the center of the outer circumferential surface of the second core body and located between adjacent second teeth in the circumferential direction.

7. The rotor of claim 6, wherein the second slide protrusion is located at the center of the first inner circumferential surface of the second extension in a circumferential direction, and the first slide groove is located at the center of the outer circumferential surface of the first core body and located between adjacent first teeth in the circumferential direction.

8. The rotor of claim 6, wherein the first slide protrusion has a width that decreases from an inner side of the first rotor core to an outer side of the first rotor core, and the second slide groove has a width that decreases from an inner side of the second rotor core to an outer side of the second rotor core, and the second slide protrusion has a width that decreases from an inner side of the second rotor core to an outer side of the second rotor core, and the first slide groove has a width that decreases from an inner side of the first rotor core to an outer side of the first rotor core.

9. A motor comprising:
a rotating shaft;
a rotor through which the rotating shaft passes; and
a stator disposed at an outside of the rotor, wherein the rotor includes:
 a first rotor core and a second rotor core that are axially stacked;
 a first insulator coupled to the first rotor core; and
 a second insulator coupled to the second rotor core, wherein:
the first rotor core includes a first core body and first teeth protruding from an outer circumferential surface of the first core body;
the second rotor core includes a second core body and second teeth protruding from an outer circumferential surface of the second core body;
the first insulator includes a body configured to surround the first teeth and a first outer guide formed at an outside of the body with respect to a radial direction of the first rotor core;
the second insulator includes a body configured to surround the second teeth and a second outer guide formed at an outside of the body with respect to a radial direction of the second rotor core; and
the first outer guide and the second outer guide are configured to abut each other,
wherein each of the first teeth includes a first extension protruding axially in a first direction past a first surface of the first core body, and each of the second teeth includes a second extension protruding axially in a second direction opposite the first direction past a first surface of the second core body,
wherein a first inner circumferential surface of the first extension is in contact with an outer circumferential surface of the second core body,
wherein a first inner circumferential surface of the second extension is in contact with an outer circumferential surface of the first core body,
wherein the first extension includes a first slide protrusion provided on the first inner circumferential surface of the first extension, the first slide protrusion comprising a second inner circumferential surface spaced apart radially inward from the first inner circumferential surface of the first extension, and the first core body includes a first slide groove provided on the outer circumferential surface of the first core body,
wherein the second extension includes a second slide protrusion provided on the first inner circumferential surface of the second extension, the second slide protrusion comprising a second inner circumferential surface spaced apart radially inward from the first inner circumferential surface of the second extension, and the second core body includes a second slide groove provided on the outer circumferential surface of the second core body, and wherein the first slide protrusion is configured to be inserted into the second slide groove, and the second slide protrusion is configured to be inserted into the first slide groove.

10. The motor of claim 9, wherein a contact surface between the first outer guide and the second outer guide is formed to be inclined with respect to a reference line passing through the contact surface in a radial direction from a center of rotation of the first rotor core and the second rotor core.

11. The motor of claim 9, wherein a convex region and a concave region are alternately formed at a contact surface between the first outer guide and the second outer guide with respect to a reference line passing through the contact surface in a radial direction from a center of rotation of the first rotor core and the second rotor core.

12. The motor of claim 11, wherein a coupling protrusion is formed at a side surface of the first outer guide facing the second outer guide, and a coupling slot into which the coupling protrusion is inserted is formed at a side surface of the second outer guide facing the first outer guide.

13. The rotor of claim 12, wherein the coupling protrusion is formed along an axial direction of the first rotor core and the second rotor core to be slidably coupled to the coupling slot.

* * * * *